US008981966B2

(12) United States Patent
Stein et al.

(10) Patent No.: US 8,981,966 B2
(45) Date of Patent: Mar. 17, 2015

(54) FUSION OF FAR INFRARED AND VISIBLE IMAGES IN ENHANCED OBSTACLE DETECTION IN AUTOMOTIVE APPLICATIONS

(71) Applicant: Mobileye Technologies Limited, Nicosia (CY)

(72) Inventors: Gideon Stein, Jerusalem (IL); Amnon Shashua, Mevasseret Zion (IL); Yoram Gdalyahu, Jerusalem (IL); Harel Livyatan, Modiin (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 229 days.

(21) Appl. No.: 13/747,657

(22) Filed: Jan. 23, 2013

(65) Prior Publication Data

US 2013/0135444 A1 May 30, 2013

Related U.S. Application Data

(63) Continuation of application No. 12/843,368, filed on Jul. 26, 2010, now Pat. No. 8,378,851, which is a continuation of application No. 11/696,731, filed on Apr. 5, 2007, now Pat. No. 7,786,898.

(60) Provisional application No. 60/809,356, filed on May 31, 2006.

(51) Int. Cl.

| | |
|---|---|
| ***G08G 1/017*** | (2006.01) |
| ***B60R 1/00*** | (2006.01) |
| ***G06K 9/00*** | (2006.01) |

(Continued)

(52) U.S. Cl.
CPC .. *H04N 7/18* (2013.01); *B60R 1/00* (2013.01); *B60R 2300/105* (2013.01); *B60R 2300/106* (2013.01); *B60R 2300/304* (2013.01); *B60R 2300/8033* (2013.01); *B60R 2300/804* (2013.01); *B60R 2300/8053* (2013.01); *B60R 2300/8093* (2013.01); *G06K 9/00369* (2013.01); *G06K 9/00805* (2013.01); *G06K 9/00825* (2013.01); *G06K 9/2018* (2013.01); *G06K 9/209* (2013.01); *G06K 9/6289* (2013.01); *G06T 7/2033* (2013.01); *G06T 2207/10048* (2013.01); *G06T 2207/30261* (2013.01)
USPC ............................ 340/937; 340/903; 340/436

(58) Field of Classification Search
USPC .............. 340/425.5, 435, 436, 437, 903, 904, 340/907, 937; 348/148, 188, 208.99; 382/104; 180/169, 170; 701/1, 300
See application file for complete search history.

(56) References Cited

U.S. PATENT DOCUMENTS 6,327,522 B1 * 12/2001 Kojima et al. .................... 701/1
6,327,536 B1 12/2001 Tsuji et al.

(Continued)

*Primary Examiner* — Van T. Trieu
(74) *Attorney, Agent, or Firm* — The Law Office of Michael E. Kondoudis

(57) ABSTRACT

A computerized system mountable on a vehicle operable to detect an object by processing first image frames from a first camera and second image frames from a second camera. A first range is determined to said detected object using the first image frames. An image location is projected of the detected object in the first image frames onto an image location in the second image frames. A second range is determined to the detected object based on both the first and second image frames. The detected object is tracked in both the first and second image frames When the detected object leaves a field of view of the first camera, a third range is determined responsive to the second range and the second image frames.

15 Claims, 11 Drawing Sheets

(51) Int. Cl.

| | |
|---|---|
| ***G06K 9/20*** | (2006.01) |
| ***G06K 9/62*** | (2006.01) |
| ***G06T 7/20*** | (2006.01) |
| ***H04N 7/18*** | (2006.01) |

(56) References Cited

U.S. PATENT DOCUMENTS

| | | | | |
|---|---|---|---|---|
| 6,934,614 | B2 | 8/2005 | Yamamura et al. | |
| 6,961,466 | B2 | 11/2005 | Imagawa et al. | |
| 7,130,448 | B2 | 10/2006 | Nagaoka et al. | |
| 7,166,841 | B2 | 1/2007 | Satou et al. | |
| 7,212,653 | B2 | 5/2007 | Sato et al | |
| 7,248,287 | B1 * | 7/2007 | Sogawa et al. | 348/208.99 |
| 7,278,505 | B2 | 10/2007 | Fujioka et al. | |
| 7,372,030 | B2 | 5/2008 | Adamietz | |
| 7,486,803 | B2 | 2/2009 | Camus | |
| 7,720,375 | B2 | 5/2010 | Aoki et al. | |
| 7,809,506 | B2 | 10/2010 | Kuge et al. | |
| 2005/0237385 | A1 | 10/2005 | Kosaka et al. | |

* cited by examiner

FUSION OF FAR INFRARED AND VISIBLE IMAGES IN ENHANCED OBSTACLE DETECTION IN AUTOMOTIVE APPLICATIONS

CROSS REFERENCE TO RELATED APPLICATIONS

CROSS REFERENCE TO RELATED APPLICATIONS

This application is a continuation of U.S. application Ser. No. 12/843,368, filed 26 Jul. 2010, now allowed, which is a continuation of U.S. Pat. No. 7,786,898, filed on 05 Apr. 2007, which claims priority from U.S. Provisional Application No. 60/809,356, filed 31 May 2006, all of which are hereby incorporated by reference in their entireties.

FIELD OF THE INVENTION

The present invention relates to vehicle warning systems, and more particularly to vehicle warning systems based on a fusion of images acquired from a far infra red (FIR) camera and a visible (VIS) light camera.

BACKGROUND OF THE INVENTION AND PRIOR ART

Automotive accidents are a major cause of loss of life and property. It is estimated that over ten million people are involved in traffic accidents annually worldwide and that of this number, about three million people are severely injured and about four hundred thousand are killed. A report "The Economic Cost of Motor Vehicle Crashes 1994" by Lawrence J. Blincoe published by the United States National Highway Traffic Safety Administration estimates that motor vehicle crashes in the U.S. in 1994 caused about 5.2 million nonfatal injuries, 40,000 fatal injuries and generated a total economic cost of about $150 billion.

To cope with automotive accidents and high cost in lives and property several technologies have been developed. One camera technology used in the vehicle is a visible light (VIS) camera (either CMOS or CCD), the camera being mounted inside the cabin, typically near the rearview mirror and looking forward onto the road. VIS light cameras are used in systems for Lane Departure Warning (LDW), vehicle detection for accident avoidance, pedestrian detection and many other applications.

Before describing prior art vehicular systems based on VIS cameras and prior art vehicular systems based on FIR cameras, the following definitions are put forward. Reference is made to FIG. 1 (prior art). FIG. 1 is a schematic view of a road scene which shows a vehicle 50 having a system 100 including a VIS camera 110 and a processing unit 130. Vehicle 50 is disposed on road surface 20, which is assumed to be leveled.

The term "following vehicle" is used herein to refer to vehicle 50 equipped with camera 110. When an obstacle of interest is another vehicle, typically traveling in substantially the same direction, then the term "lead vehicle" or "leading vehicle" is used herein to refer to the obstacle. The term "back" of the obstacle is defined herein to refer to the end of the obstacle nearest to the following vehicle 50, typically the rear end of the lead vehicle, while both vehicles are traveling forward in the same direction. The term "back", in rear facing applications means the front of the obstacle behind host vehicle 50.

The term "ground plane" is used herein to refer to the plane best representing the road surface segment between following vehicle 50 and obstacle 10. The term "ground plane constraint" is used herein to refer to the assumption of a planar ground plane.

The terms "object" and "obstacle" are used herein interchangeably.

The terms "upper", "lower", "below", "bottom", "top" and like terms as used herein are in the frame of reference of the object not in the frame of reference of the image. Although real images are typically inverted, the wheels of the leading vehicle in the imaged vehicle are considered to be at the bottom of the image of the vehicle.

The term "bottom" as used herein refers to the image of the bottom of the obstacle, defined by the image of the intersection between a portion of a vertical plane tangent to the "back" of the obstacle with the road surface; hence the term "bottom" is defined herein as image of a line segment (at location 12) which is located on the road surface and is transverse to the direction of the road at the back of the obstacle.

The term "behind" as used herein refers to an object being behind another object, relative to the road longitudinal axis. A VIS camera, for example, is typically 1 to 2 meters behind the front bumper of host vehicle 50.

The term "range" is used herein to refer to the instantaneous distance D from the "bottom" of the obstacle to the front, e.g. front bumper, of following vehicle 50.

The term "Infrared" (IR) as used herein is an electromagnetic radiation of a wavelength longer than that of visible light. The term "far infrared" (FIR) as used herein is a part of the IR spectrum with wavelength between 8 and 12 micrometers. The term "near infrared" (NIR) as used herein is a part of the IR spectrum with wavelength between 0.7 and 2 micrometers.

The term "Field Of View" (FOV; also known as field of vision) as used herein is the angular extent of a given scene, delineated by the angle of a three dimensional cone that is imaged onto an image sensor of a camera, the camera being the vertex of the three dimensional cone. The FOV of a camera at particular distances is determined by the focal length of the lens: the longer the focal length, the narrower the field of view.

The term "Focus Of Expansion" (FOE) is the intersection of the translation vector of the camera with the image plane. The FOE is the commonly used for the point in the image that represents the direction of motion of the camera. The point appears stationary while all other feature points appear to flow out from that point. FIG. 4*a* (prior art) illustrate the focus of expansion which is the image point towards which the camera is moving. With a positive component of velocity along the optic axis, image features will appear to move away from the FOE and expand, with those closer to the FOE moving slowly and those further away moving more rapidly.

The term "baseline" as used herein is the distance between a pair of stereo cameras used for measuring distance from an object. In the case of obstacle avoidance in automotive applications, to get an accurate distance estimates from a camera pair a "wide baseline" of at least 50 centimeters is needed, which would be ideal from a theoretical point of view, but is not practical since the resulting unit is very bulky.

The world coordinate system of a camera 110 mounted on a vehicle 50 as used herein is defined to be aligned with the camera and illustrated in FIG. 3 (prior art). It is assumed that the optical axis of the camera is aligned with the forward axis of the vehicle, which is denoted as axis Z, meaning that the world coordinates system of the vehicle is parallel that the world coordinate system of the camera. Axis X of the world coordinates is to the left and axis Y is upwards. All axes are perpendicular to each other. Axes Z and X are assumed to be parallel to road surface 20.

The terms "lateral" and "lateral motion" is used herein to refer to a direction along the X axis of an object world coordinate system.

The term "scale change" as used herein is the change of image size of the target due to the change in distance.

"Epipolar geometry" refers to the geometry of stereo vision. Referring to FIG. 4*b*, the two upright planes 80 and 82 represent the image planes of the two cameras that jointly combine the stereo vision system. $O_L$ and $O_R$ represent the focal points of the two cameras given a pinhole camera representation of the cameras. P represents a point of interest in both cameras. $p_L$ and $p_R$ represent where point P is projected onto the image planes. All epipolar lines go through the epipole which is the projection center for each camera, denoted by $E_L$ and $E_R$. The plane formed by the focal points $O_L$ and $O_R$ and the point P is the epipolar plane. The epipolar line is the line where the epipolar plane intersects the image plane.

Vehicular Systems Based on Visible Light (VIS) Cameras:

Systems based on visible light (VIS) cameras for detecting the road and lanes structure, as well as the lanes vanishing point are known in the art. Such a system is described in U.S. Pat. No. 7,151,996 given to Stein et al, the disclosure of which is incorporated herein by reference for all purposes as if entirely set forth herein. Road geometry and triangulation computation of the road structure are described in patent '996. The use of road geometry works well for some applications, such as Forward Collision Warning (FCW) systems based on scale change computations, and other applications such as headway monitoring, Adaptive Cruise Control (ACC) which require knowing the actual distance to the vehicle ahead, and Lane Change Assist (LCA), where a camera is attached to or integrated into the side mirror, facing backwards. In the LCA application, a following vehicle is detected when entering a zone at specific distance (e.g. 17 meters), and thus a decision is made if it is safe to change lanes, Systems and methods for obstacle detection and distance estimations, using visible light (VIS) cameras, are well known in the automotive industry. A system for detecting obstacles to a vehicle motion is described in U.S. Pat. No. 7,113,867 given to Stein et al, the disclosure of which is included herein by reference for all purposes as if entirely set forth herein.

A pedestrian detection system is described in U.S. application Ser. No. 10/599,635 by Shashua et al, the disclosure of which is included herein by reference for all purposes as if entirely set forth herein. U.S. application Ser. No. 11/599,635 provides a system mounted on a host vehicle and methods for detecting pedestrians in a VIS image frame.

A distance measurement from a VIS camera image frame is described in "Vision based. ACC with a Single Camera: Bounds on Range and Range Rate Accuracy" by Stein et al., presented at the IEEE Intelligent Vehicles Symposium (IV2003), the disclosure of which is incorporated herein by reference for all purposes as if entirely set forth herein. Distance measurement is further discussed in U.S. application Ser. No. 11/554,048 by Stein et al, the disclosure of which is included herein by reference for all purposes as if entirely set forth herein. U.S. application Ser. No. 11/554,048 provides methods for refining distance measurements from the "front" of a host vehicle to an obstacle.

Referring back to FIG. 1 (prior art), a road scene with vehicle 50 having a distance measuring apparatus 100 is illustrated, apparatus 100 including a VIS camera 110 and a processing unit 130. VIS camera 110 has an optical axis 113 which is preferably calibrated to be generally parallel to the surface of road 20 and hence, assuming surface of road 20 is level (i.e complying with the "ground plane constraint"), optical axis 113 points to the horizon. The horizon is shown as a line perpendicular to the plane of FIG. 1 shown at point 118 parallel to road 20 and located at a height $H_{cam}$ of optical center 116 of camera 110 above road surface 20.

The distance D to location 12 on the road 20 may be calculated, given the camera optic center 116 height $H_{cam}$, camera focal length f and assuming a planar road surface:

$$D = \frac{f H_{cam}}{y_{bot}} \tag{1}$$

The distance is measured, for example, to location 12, which corresponds to the "bottom edge" of pedestrian 10 at location 12 where a vertical plane, tangent to the back of pedestrian 10 meets road surface 20.

Referring to equation 1, the error in measuring distance D is directly dependent on the height of the camera, $H_{cam}$. FIG. 2 graphically demonstrates the error in distance, as a result of just two pixels error in the horizon location estimate, for three different camera heights. It can be seen that the lower the camera is the more sensitive is the distance estimation to errors.

Height $H_{cam}$ in a typical passenger car 50 is typically between 1.2 meter and 1.4 meter. Camera 110 is mounted very close to the vehicle center in the lateral dimension. In OEM (Original Equipment Manufacturing) designs, VIS camera 110 is often in the rearview mirror fixture. The mounting of a VIS camera 110 at a height between of 1.2 meter and 1.4 meter, and very close to the vehicle center in the lateral dimension, is quite optimal since VIS camera 110 is protected behind the windshield (within the area cleaned by the wipers), good visibility of the road is available and good triangulation is possible to correctly estimated distances to the lane boundaries and other obstacles on the road plane 20. Camera 110 is compact and can easily be hidden out of sight behind the rearview mirror and thus not obstruct the driver's vision.

A VIS camera 110 gives good daytime pictures. However, due to the limited sensitivity of low cost automotive qualified sensors, VIS camera 110 cannot detect pedestrians at night unless the pedestrians are in the area illuminated by the host vehicle 50 headlights. When using low beams, the whole body of a pedestrian is visible up to a distance of 10 meters and the feet up a distance of about 25 meters.

Vehicular Systems Based on Visible Light (FIR) Cameras:

Far infrared (FIR) cameras are used in prior art automotive applications, such as the night vision system on the Cadillac DeVille introduced by GM in 2000, to provide better night vision capabilities to drivers. Typically, a FIR image is projected onto the host vehicle 50 windshield and is used to provide improved visibility of pedestrians, large animals and other warm obstacles. Using computer vision techniques, important obstacles such as pedestrians can be detected and highlighted in the image. Since FIR does not penetrate glass, the FIR camera is mounted outside the windshield and typically, in front of the engine so that the image is not masked by the engine heat. The mounting height is therefore typically in the range of 30 centimeters to 70 centimeters from the ground, and the camera is preferably mounted a bit shifted from center to be better aligned with the viewpoint of the vehicle driver.

Reference is made to FIG. 7*a* which exemplifies a situation where a pedestrian 10 is on the side-walk 30, which is not on the ground plane 20 of the host vehicle 50. Reference is also made to FIG. 7*b* which depicts an example of severe vertical curves in road 20 that place the feet of the pedestrian 10 below the road plane 20, as defined by host vehicle 50 wheels.

It should be noted that when a detected pedestrian 10 is on sidewalk 30, the sidewalk 30 upper surface being typically higher above road 20 surface, for example by 15 centimeters, as illustrated in FIG. 7*a*. With a camera height of 70 centimeters, the difference in height between sidewalk 30 upper surface and road 20 surface introduces an additional error in distance estimation, typically of about 15% to 20%. The error is doubled for a camera at 35 centimeters height. An error in distance estimation also occurs on vertically curved roads, where a pedestrian 10 may be below the ground plane 20 of the host vehicle 50, as exemplified by FIG. 7*b*. In other situations a pedestrian 10 may appear above the ground plane 20 of the host vehicle 50. In conclusion, the errors in the range estimation, when using of road geometry constraints, can be very large for a camera height of 70 centimeters, and the value obtained is virtually useless.

With a FIR system, the target bottom 12 can still be determined accurately, however it is difficult to determine the exact horizon position, since road features such as lane markings are not visible. Thus, in effect, the error in $y_{bot}$ can typically be 8-10 pixels, especially when driving on a bumpy road, or when the road curves up or down or when the host vehicle is accelerating and decelerating. The percentage error in the range estimate even for a camera height of 70 centimeters can be large (often over 50%). FIG. 2 graphically demonstrates the error in distance, as result of just 2 pixels error in the horizon location estimate, for three different camera heights. It can be seen that the lower the camera is the more sensitive is the distance estimation to errors.

In contrast with VIS cameras, FIR cameras are very good at detecting pedestrians in most night scenes. There are certain weather conditions, in which detecting pedestrians is more difficult. Since the main purpose of the FIR camera is to enhance the driver's night vision, the FIR camera is designed to allow visibility of targets at more than 100 meters, resulting in a FIR camera design with a narrow Field Of View (FOV). Since the camera mounting is very low, range estimation using the ground plane constraint and triangulation is not possible. The FIR camera is typically of low resolution (320×240). FIR cameras are quite expensive, which makes a two FIR camera stereo system not a commercially viable option.

Stereo Based Vehicular Systems:

Stereo cameras have been proposed for obstacle avoidance in automotive applications and have been implemented in a few test vehicles. Since visible light cameras are quite cheap it appears a reasonable approach to mount a pair of cameras at the top of the windshield. The problem is that to get accurate distance estimates from a camera pair, a "wide baseline" is needed, but a "wide baseline" results in a bulky unit which cannot be discretely installed. A "wide baseline" of 50 centimeters or more would be ideal from a theoretical point of view, but is not practical.

Definitions

The term "vehicle environment" is used herein to refer to the outside scene surrounding a vehicle in depth of up to a few hundreds of meters as viewed by a camera and which is within a field of view of the camera.

The term "patch" as used herein refers to a portion of an image having any shape and dimensions smaller or equal to the image dimensions.

The term "centroid" of an object in three-dimensional space is the intersection of all planes that divide the object into two equal spaces. Informally, it is the "average" of all points of the object.

SUMMARY OF THE INVENTION

According to the present invention there is provided a method in computerized system mounted on a vehicle including a cabin and an engine. The system including a visible (VIS) camera sensitive to visible light, the VIS camera mounted inside the cabin, wherein the VIS camera acquires consecutively in real time multiple image frames including VIS images of an object within a field of view of the VIS camera and in the environment of the vehicle. The system also including a FIR camera mounted on the vehicle in front of the engine, wherein the FIR camera acquires consecutively in real time multiple FIR image frames including FIR images of the object within a field of view of the FIR camera and in the environment of the vehicle. The FIR images and VIS images are processed simultaneously, thereby producing a detected object when the object is present in the environment.

In a dark scene, at a distance over 25 meters, FIR images are used to detect warm objects such as pedestrians. At a distance of 25 meters and less, the distance from the vehicle front to the detected object illuminated by the vehicle headlights, is computed from one of the VIS images. The image location of the detected object in the VIS image is projected onto a location in one of the FIR images, the detected object is identified in the FIR image and the position of the detected object in the FIR image is aligned with the position of the detected object in the VIS image. The distance measured from the vehicle front to the object is used to refine by a stereo analysis of the simultaneously processed FIR and VIS images. The distance measured using the FIR image can also enhance the confidence of the distance measured using the VIS image.

In embodiments of the present invention the VIS camera is replace by a Near IR camera.

In embodiments of the present invention the VIS camera is operatively connected to a processor that performs collision avoidance by triggering braking.

In another method used by embodiments of the present invention, in a dark scene, at a distance over 10 meters, FIR images are used to detect warm objects such as pedestrians, vehicle tires, vehicle exhaust system and other heat emitting objects. The image location of the detected object in the FIR image is projected onto a location in one of the VIS images, the detected object is identified in the VIS image and the position of the detected object in the VIS image is aligned with the position of the detected object in the FIR image. The distance measured from the vehicle front to the object is used to refine by a stereo analysis of the simultaneously processed VIS and FIR images. The distance measured using the VIS image can also enhance the confidence of the distance measured using the FIR image. If no matching object is located in the VIS image, the camera gain and/or exposure the VIS camera/image can be adjusted until at least a portion of the object is located.

In embodiments of the present invention tracking of the aligned detected object is performed using at least two VIS images.

In embodiments of the present invention tracking of the aligned detected object is performed using at least two FIR images.

In embodiments of the present invention tracking of the aligned detected object is performed using at least two FIR images and two VIS images.

In embodiments of the present invention the brightness in a FIR image is used to verify that the temperature a detected object identified as a pedestrian matches that of a human.

In embodiments of the present invention estimating the distance from the vehicle front to a detected object in at least two FIR images includes determining the scale change ratio between dimensions of the detected object in the images and using the scale change ratio and the vehicle speed to refine the distance estimation.

In embodiments of the present invention the estimating the distance from the vehicle front to a detected object includes determining an accurate lateral distance to the detected object and determining if the object is in the moving vehicle path and in danger of collision with the moving vehicle.

BRIEF DESCRIPTION OF THE DRAWINGS

The present invention will become fully understood from the detailed description given herein below and the accompanying drawings, which are given by way of illustration and example only and thus not limitative of the present invention.

DESCRIPTION OF THE PREFERRED EMBODIMENTS

Figure 1:
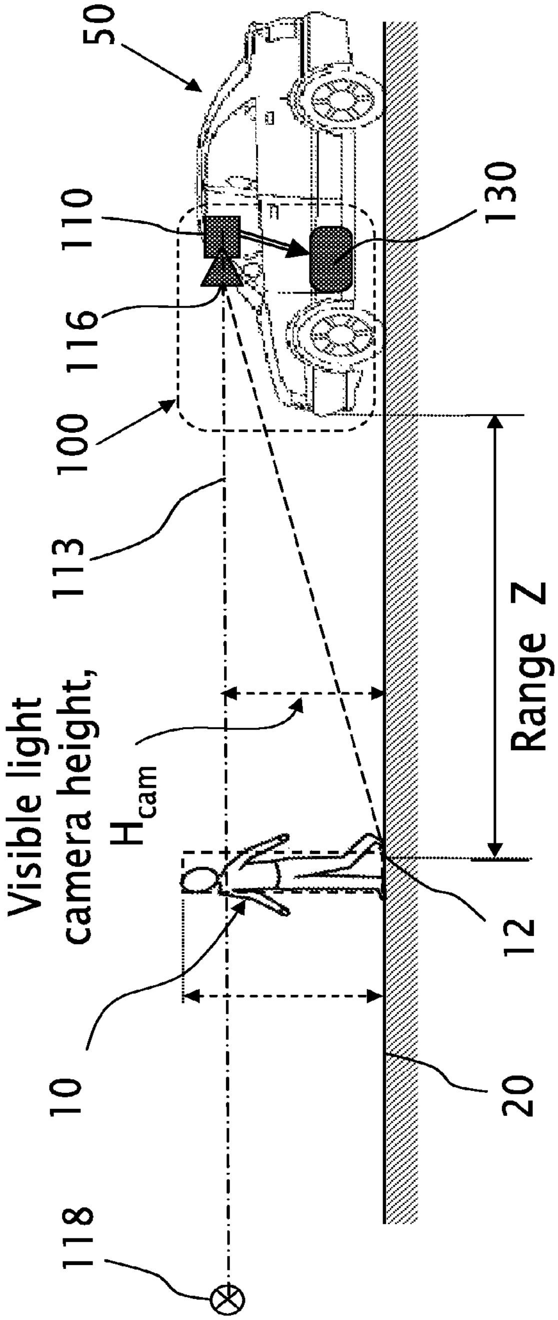
FIG. 1 (prior art) illustrates a vehicle with distance measuring apparatus, including a visible light camera and a computer useful for practicing embodiments of the present invention.

The present invention is of a system and method of processing image frames of an obstacle as viewed in real time from two cameras mounted in a vehicle: a visible light (VIS) camera and a FIR camera, whereas the VIS camera is mounted inside the cabin behind the windshield and the FIR camera is mounted in front of the engine, so that the image is not masked by the engine heat. Specifically, at night scenes, the system and method processes images of both cameras simultaneously, whereas the FIR images typically dominate detection and distance measurements in distances over 25 meters, the VIS images typically dominate detection and distance measurements in distances below 10 meters, and in the range of 10-25 meters, stereo processing of VIS images and corresponding FIR images is taking place.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Embodiments of the present invention are preferably implemented using instrumentation well known in the art of image capture and processing, typically including an image capturing devices, e.g. VIS camera 110, FIR camera 120 and an image processor 130, capable of buffering and processing images in real time. A VIS camera typically has a wider FOV of 35°-50° (angular) which corresponds to a focal length of 8 mm-6 mm (assuming the Micron MT9V022, a VGA sensor with a square pixel size of 6 um), and that enables obstacle detection in the range of 90-50 meters. VIS camera 110 preferably has a wide angle of 42°, f/n. A FIR camera typically has a narrower FOV of 15°-25°, and that enables obstacle detection in the range above 100 meters. FIR camera 120 preferably has a narrow angle of 15°, f/n Moreover, according to actual instrumentation and equipment of preferred embodiments of the method and system of the present invention, several selected steps could be implemented by hardware, firmware or by software on any operating system or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a processor, such as a computing platform for executing a plurality of instructions, Unless otherwise defined, all technical and scientific terms used herein have the same meaning as commonly understood by one of ordinary skill in the art to which this invention belongs. The methods, and examples provided herein are illustrative only and not intended to be limiting.

By way of introduction the present invention intends to provide in a vehicle tracking or control system which adequately detects obstacles in ranges of zero and up to and more than 100 meters from the front of the host vehicle. The system detects obstacles in day scenes, lit and unlit night scenes and at different weather conditions. The system includes a computerized processing unit and two cameras mounted in a vehicle: a visible light (VIS) camera and a FIR camera, whereas the VIS camera is mounted inside the cabin behind the windshield and the FIR camera is mounted in front of the engine and detects heat emitting objects. The cameras are mounted such that there is a wide baseline for stereo analysis of corresponding VIS images and FIR images.

It should be noted, that although the discussion herein relates to a forward moving vehicle equipped with VIS camera and FIR camera pointing forward in the direction of motion of host vehicle moving forward, the present invention may, by non-limiting example, alternatively be configured as well using VIS camera and FIR camera pointing backward in the direction of motion of host vehicle moving forward, and equivalently detecting objects and measure the range therefrom.

It should be further noted that the principles of the present invention are applicable in Collision Warning Systems, such as Forward Collision Warning (FCW) systems based on scale change computations, and other applications such as headway monitoring and Adaptive Cruise Control (ACC) which require knowing the actual distance to the vehicle ahead. Another application is Lane Change Assist (LCA), where VIS camera is attached to or integrated into the side mirror, facing backwards. In the LCA application, a following vehicle is detected when entering a zone at specific distance (e.g. 17 meters), and thus a decision is made if it is safe to change lanes.

Figure 5A:
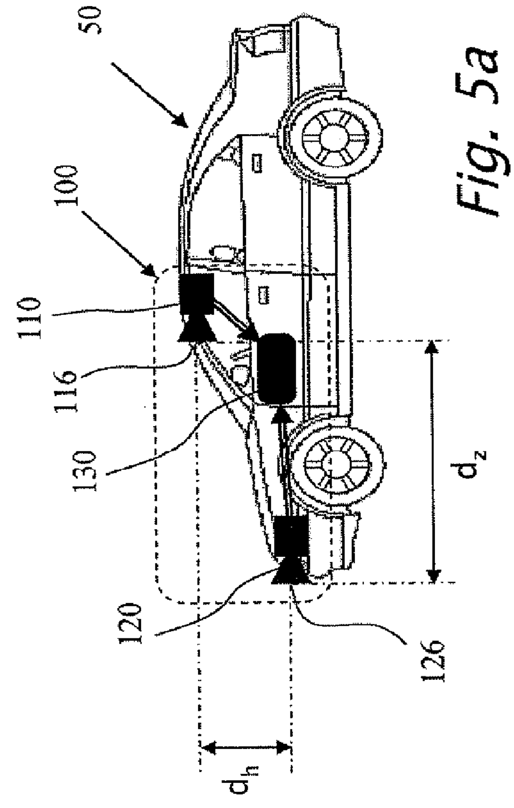
FIG. 5*a* is a side view illustration of an embodiment of a vehicle warning system according to the present invention.

Object detecting system 100 of the present invention combines two commonly used object detecting system: a VIS camera based system a FIR camera based system. No adjustment to the mounting location of the two sensors 110 and 120 is required, compared with the prior art location. The added boost in performance of the object detecting system 100 of the present invention, benefits by combining existing outputs of the two sensors 110 and 120 with computation and algorithms, according to different embodiments of the present invention. Reference is now made to FIG. 5*a*, which is a side view illustration of an embodiment of following vehicle 50 having an object detecting system 100 according to the present invention, and FIG. 5*b* which is a top view illustration of the embodiment of FIG. 5*a*. System 100 includes a VIS camera 110, a FIR camera 120 and an Electronic Control. Unit (ECU) 130.

Figure 5B:
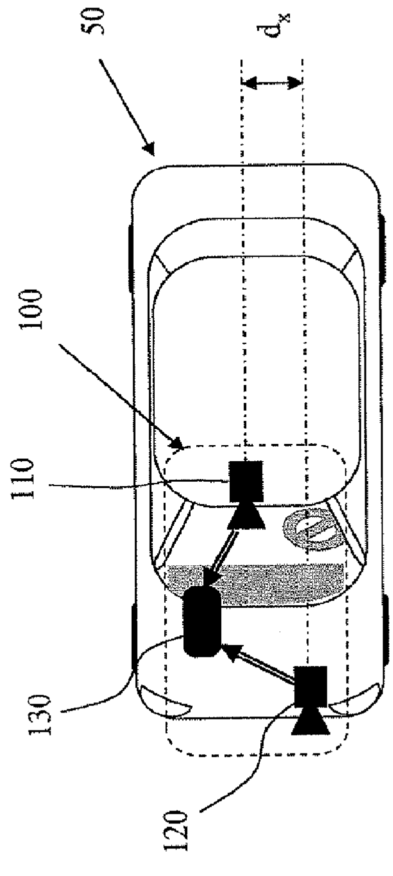
FIG. 5*b* is a top view illustration of the embodiment of FIG. 5*a;*

The present invention combines the output from a visible light sensor 110 and a FIR sensor 120. Each sensor performs an important application independent of the other sensor, and each sensor is positioned in the vehicle 50 to perform the sensor own function optimally. The relative positioning of the two sensors 110 and 120 has been determined to be suitable for fusing together the information from both sensors and getting a significant boost in performance:

a) There is a large height difference between the two sensors 110 and 120, rendering a very wide baseline for stereo analysis. The difference in the height at which the two sensors 110 and 120 are mounted, is denoted by $d_h$, as shown in FIG. 5*a*.
b) Typically, there is also a lateral displacement difference between the sensors 110 and 120, giving additional baseline for stereo analysis performed by processing unit 130. The difference in the lateral displacement is denoted by $d_x$, as shown in FIG. 5*b*.
c) VIS camera 110 has a wider FOV (relative to the FOV of FIR camera 120) and is 1-2 meters behind FIR camera 120 so that VIS camera 110 covers the critical blind spots of FIR camera 120, which also has a narrower FOV (relative to the FOV of VIS camera 110). The blind spots are close to vehicle 50 and are well illuminated even by the vehicle's low beams. In the close range regions (illuminated by the vehicle's low beams), pedestrian detection at night can be done with VIS camera 110. The difference in the range displacement is denoted by $d_z$, as shown in FIG. 5*a*.

Figure 6:
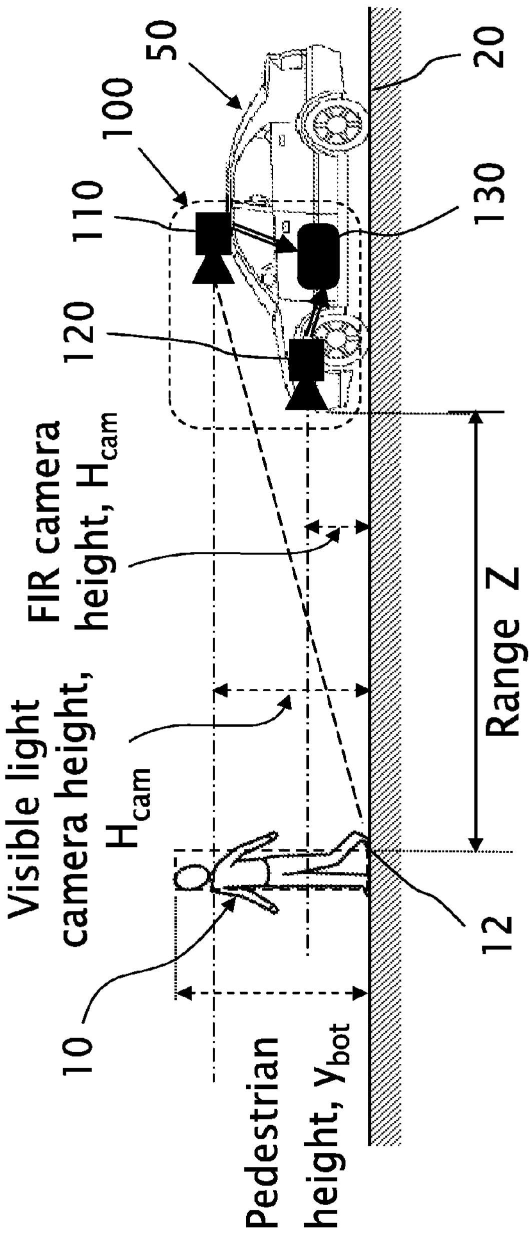
FIG. 6 schematically shows a following vehicle having a distance warning system, operating to provide an accurate distance measurement from a pedestrian in front of the following vehicle, in accordance with an embodiment of the present invention.

An aspect of the present invention is to enhance range estimates to detected objects 10. FIG. 6 shows a following vehicle 50 having an object detecting system 100, operating to provide an accurate distance D measurement from a detected object, such as a pedestrian 10, in front of the following vehicle 50, in accordance with an embodiment of the present invention. While the use of road geometry (i.e. triangulation) works well for some applications, using road geometry is not really suitable for range estimation of pedestrians 10 with FIR cameras 120, given a camera height of less than 75 centimeters.

Figure 7A:
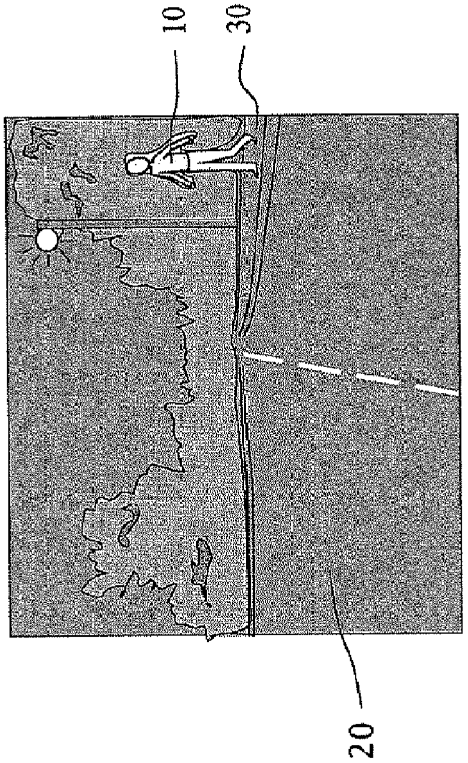
FIG. 7*a* exemplifies a situation where a pedestrian is on the side-walk, which is not on the ground plane of the host vehicle.
Figure 7B:
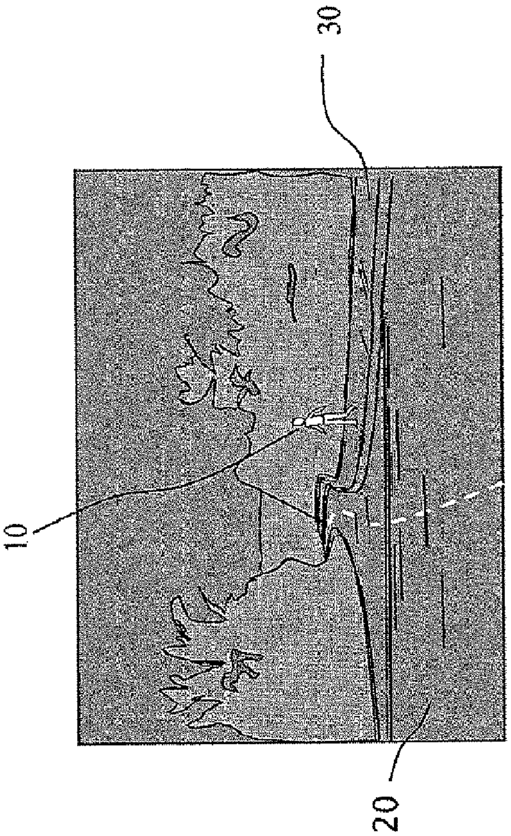
FIG. 7*b* depicts an example of severe curves in road that place the feet of the pedestrian below the road plane as defined by the host vehicle wheels.

The computation of the pedestrian 10 distance D using the ground plane assumption uses equation 1, where f is the focal length of camera used (for example, 500 pixels for FOV=36° of a VIS camera 110), $y=y_{bot}$ (shown in FIG. 6) is the position of bottom 12 of the pedestrian 10 in the image relative to the horizon, and $H_{cam}$ is a camera height. The assumption here is that pedestrian 10 is standing on road plane 20, but this assumption can be erroneous, as depicted in FIGS. 7*a* and 7*b*.

Improving Range Estimation in a System Based on FIR Cameras:

Typically, in FIR images, the head and feet of a pedestrian 10 can be accurately located in the image frame acquired (within 1 pixel). The height of pedestrian 10 is assumed to be known (for example, 1.7 m) and thus, a range estimate can be computed:

$$D = \frac{f^{*}1.7}{h} \tag{2}$$

where h is the height of pedestrian 10 in the image and f is the focal length of the camera.

A second feature that can be used is the change of image size of the target due to the change in distance of the camera from the object, which is herein referred to as "scale change". Two assumptions are made here:

a) The speed of vehicle 50 is available and is non-zero.
b) The speed of pedestrian 10 in the direction parallel to the Z axis of vehicle 50 (see FIG. 3) is small relative to the speed of vehicle 50.

The height of pedestrian 1.0 in two consecutive images is denoted as $h_1$ and $h_2$, respectively. The scale change s between the two consecutive images is then defined as:

$$s = \frac{h_1 - h_2}{h_1} \tag{3}$$

It can be shown that:

$$s = \frac{v\Delta t}{D} \tag{4}$$

or range D is related to scale change by:

$$D = \frac{v\Delta t}{s} \tag{5}$$

where v is the vehicle speed and Δt is the time difference between the two consecutive images.

The estimation of range D becomes more accurate as host vehicle 50 is closing in on pedestrian 10 rapidly and the closer host vehicle 50 is to pedestrian 10 the more important is range measurement accuracy. The estimation of range D using the scale change method is less accurate for far objects, as the scale change is small, approaching the measurement error. However, measurements of scale change may be made using frames that are more spaced out over time.

Figure 4A:
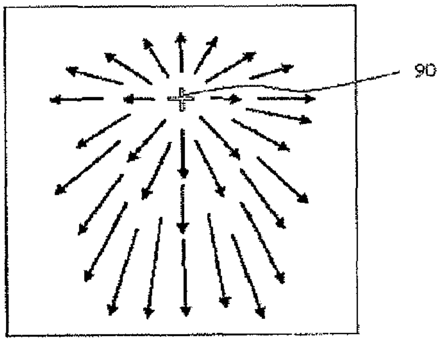
FIG. 4*a* (prior art) illustrate the focus of expansion phenomenon.
Figure 4B:
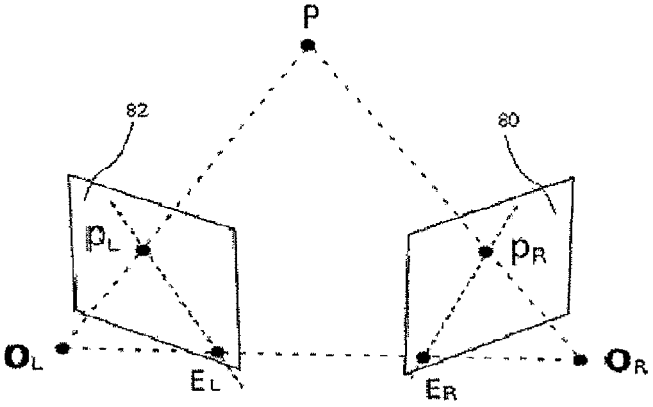
FIG. 4*b* (prior art) graphically defines epipolar geometry.

For stationary pedestrians or objects 10 not in the path of vehicle 50 (for example pedestrians 10 standing on the sidewalk waiting to cross), the motion of the centroid of object 10 can be used. Equation 5 is used, but the "scale change" s is now the relative change in the lateral position in the FIR image frame of object 10 relative to the focus of expansion (FOE) 90 (see FIG. 4a). Since a lateral motion of pedestrian 10 in the image can be significant, the fact that no leg motion is observed is used to determine that pedestrian 10 is in fact stationary.

Stereo Analysis Methods Using FIR and VIS Cameras

Figure 2:
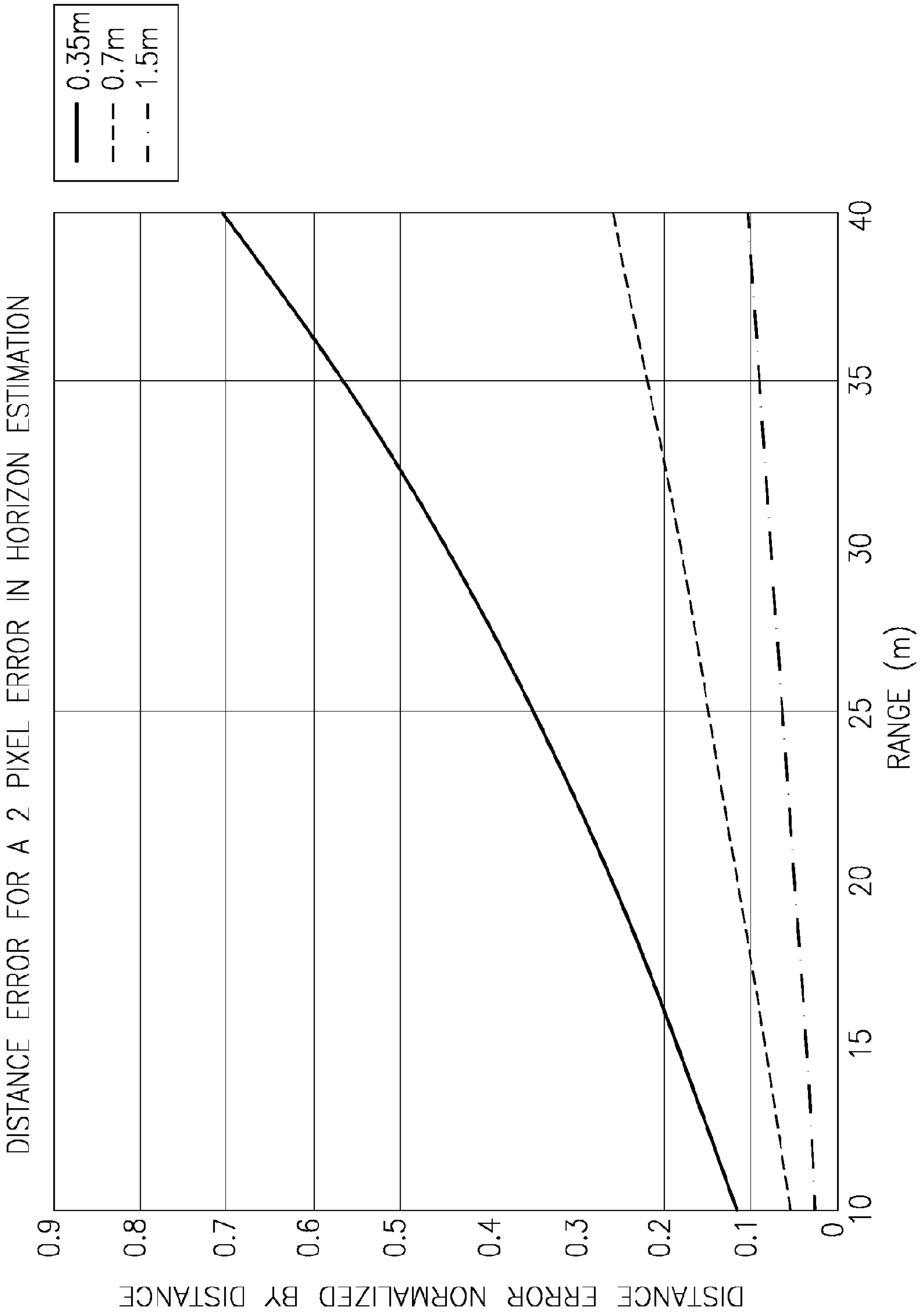
FIG. 2 (prior art) graphically demonstrates the error in distance, as result of a two pixel error in horizon estimate, for three different camera heights.

The range D estimates are combined using known height and scale change. Weighting is based on observed vehicle 50 speed. One possible configuration of an object detecting system 100, according to the present invention, is shown in FIGS. 1 and 2. FIR camera 120 is shown at the vehicle 50 front bumper. VIS camera 110 is located inside the cabin at the top of the windshield, near the rear-view mirror. Both cameras 110 and 120 are connected to a common computing unit or ECU 130.

Figure 3:
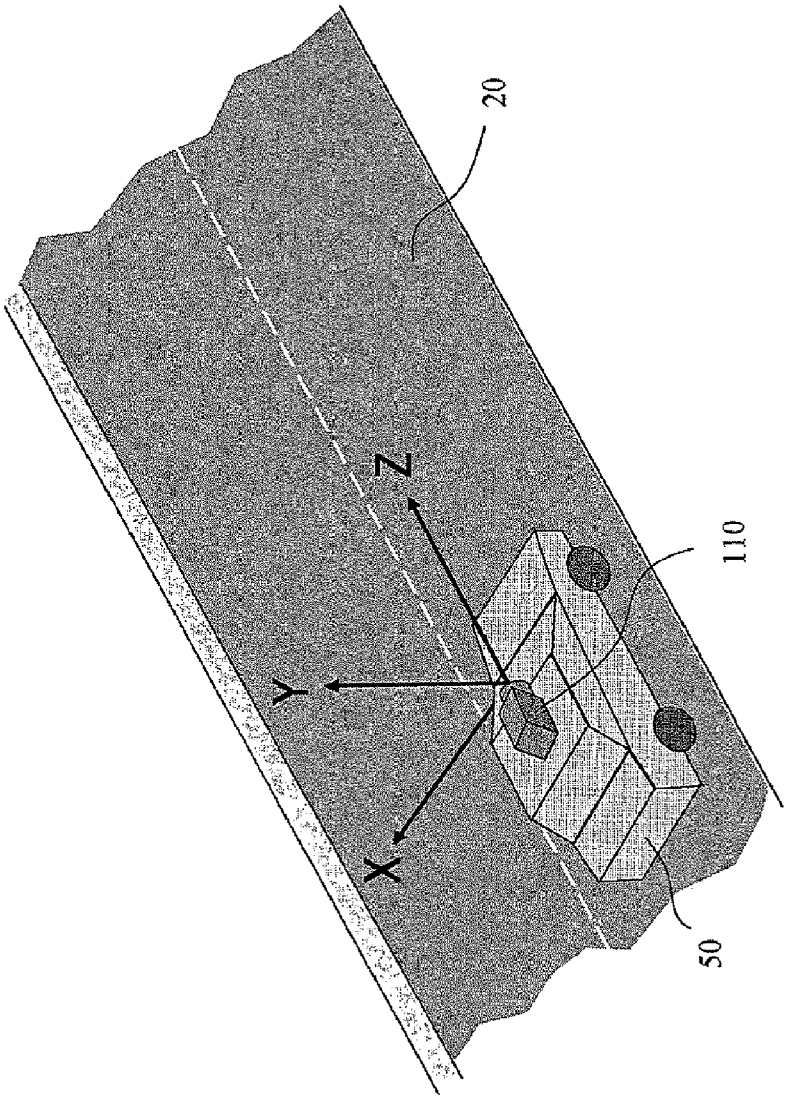
FIG. 3 (prior art) graphically defines the world coordinates of a camera mounted on a vehicle.

The world coordinate system of a camera is illustrated in FIG. 3 (prior art). For simplicity, it is assumed that the optical axis of FIR camera 120 is aligned with the forward axis of the vehicle 50, which is the axis Z. Axis X of the world coordinates is to the left and axis Y is upwards.

The coordinate of optical center 126 of FIR camera 120 $P_f$ is thus:

$$P_f = \begin{pmatrix} 0 \\ 0 \\ 0 \end{pmatrix} \tag{6}$$

The optical center 116 of VIS camera 110 is located at the point $P_v$:

$$P_v = \begin{pmatrix} X_v \\ Y_v \\ Z_v \end{pmatrix} \tag{7}$$

In one particular example the values can be:

$$X_v = -0.2 \text{ meter} \tag{8}$$

$$Y_v = (1.2-0.5) = 0.7 \text{ meter} \tag{9}$$

$$Z_f = -1.5 \text{ meter} \tag{10}$$

In other words, in the above example, VIS camera 110 is mounted near the rearview mirror, 1.5 meter behind FIR camera 120, 0.7 meter above FIR camera 120 a and 0.2 meter off to the right of optical center 126 of FIR camera 120. The optical axes of the two cameras 110 and 120 are assumed to be aligned (In practice, one could do rectification to ensure this alignment).

The image coordinates, in FIR camera 120, of a point $P=(X, Y, Z)^T$ in world coordinates is given by the equations:

$$P_f = \begin{pmatrix} x_f \\ y_f \end{pmatrix} = \begin{pmatrix} \frac{f_1 X}{Z} \\ \frac{f_1 Y}{Z} \end{pmatrix} \tag{11}$$

where $f_1$ is the focal length of FIR camera 120 in pixels.

In practice, for example, the focal length could be $f_1=2000$.

The image coordinates, in VIS camera 110, of the same point P is given by the equations:

$$P_v = \begin{pmatrix} x_v \\ y_v \end{pmatrix} = \begin{pmatrix} \frac{f_2(X - X_v)}{Z - Z_v} \\ \frac{f_2(Y - Y_v)}{Z - Z_v} \end{pmatrix} \tag{12}$$

where $f_2$ is the focal length of VIS camera 110 in pixels.

In practice, for example, the focal length could be $f_2=800$, indicating a wider field of view.

Next, for each point in the FIR image, processor 130 finds where a given point might fall in the VIS image. Equation 11 is inverted:

$$X = \frac{x_f D}{f_1} \tag{13}$$

$$Y = \frac{y_f D}{f_1} \tag{14}$$

The values for X and Y are inserted into equation 12. For each distance D a point $p_v$ is obtained. As D varies, $p_v$ draws a line called the epipolar line.

A way to project points from the FIR image to the VIS image, as a function of distance D, is now established. For example, given a rectangle around a candidate pedestrian in the FIR image, the location of that rectangle can be projected onto the VIS image, as a function of the distance D. The rectangle will project to a rectangle with the same aspect ratio. Since the two cameras 110 and 120 are not on the same plane (i.e. $X_f \neq 0$) the rectangle size will vary slightly from the ratio $$\frac{f_1}{f_2}.$$

In order to compute the alignment between patches in the FIR and visible light images, a suitable metric must be defined. Due to very different characteristics of the two images, it is not possible to use simple correlation or sum square differences (SSD) as is typically used for stereo alignment.

A target candidate is detected in the FIR image and is defined by an enclosing rectangle. The rectangle is projected onto the visible image and test for alignment. The following three methods can be used to compute an alignment score. The method using Mutual Information can be used for matching pedestrians detected in the FIR to regions in the visible light image. The other two methods can also be used for matching targets detected in the visible light image to regions in the FIR image. They are also more suitable for vehicle targets.

Alignment using Mutual Information: since a FIR image of the pedestrian 10 is typically much brighter than the background, it is possible to apply a threshold to the pixels inside the surrounding rectangle. The binary image will define foreground pixels belonging to the pedestrian 10 and background pixels. Each possible alignment divides the pixels in the visible light image into two groups: those that are overlaid with ones from the binary and those that are overlaid with the zeros.

Histograms of the gray level values for each of the two groups can be computed. Mutual information can be used to measure the similarity between two distributions or histograms. An alignment which produces histograms which are the least similar are selected as best alignment.

In addition to using histograms of gray levels, histograms of texture features such as gradient directions or local spatial frequencies such as the response to a series of Gabor filters and so forth, can be used.

Alignment using Sub-patch Correlation: a method for determining the optimal alignment based on the fact that even though the image quality is very different, there are many edge features that appear in both images. The method steps are as follows:

a) The rectangle is split into small patches (for example, 10×10 pixels each).
b) For each patch in the FIR that has significant edge like features (one way to determine if there are edge-like features is to compute the magnitude of the gradient at every pixel in the patch. The mean (m) and standard deviation (sigma) of the gradients are computed. The number of pixels that have a gradient which is at least N*sigma over the mean are counted. If the number of pixels is larger than a threshold T then it is likely to have significant edge features. For example: N can be 3 and T can be 3):
c) The patch is scaled according to the ratio $$\frac{f_1}{f_2}.$$

The location of the center of the patch along the epipolar line is computed in the visible image as a function of the distance D.

For each location of the center of the patch along the epipolar line, the absolute value of the normalized correlation is computed.

Local maxima points are determined.

d) The distance D, for which the maximum number of patches have a local maxima is selected as the optimal alignment and the distance D is the estimated distance to the pedestrian 10.

Alignment using the Hausdorf Distance: The method steps are as follows:

a) A binary edge map of the two images (for example, using the canny edge detector) is computed.
b) For a given distance D, equations 11 and 12 are used to project the edge points in the candidate rectangle from the FIR image onto the visible light image.
c) The Hausdorf distance between the points is computed.
d) The optimal alignment (and optimal distance D) is the one that minimizes the Hausdorf distance.

Being able to align and match FIR images and corresponding visible light images, the following advantages of the fusion of the two sensors, can be rendered as follows:

1. Enhanced Range Estimates

Due to the location restrictions in mounting FIR camera 120 there is a significant height disparity between FIR camera 120 and VIS camera 110. Thus, the two sensors can be used as a stereo pair with a wide baseline giving accurate depth estimates.

Figure 8:
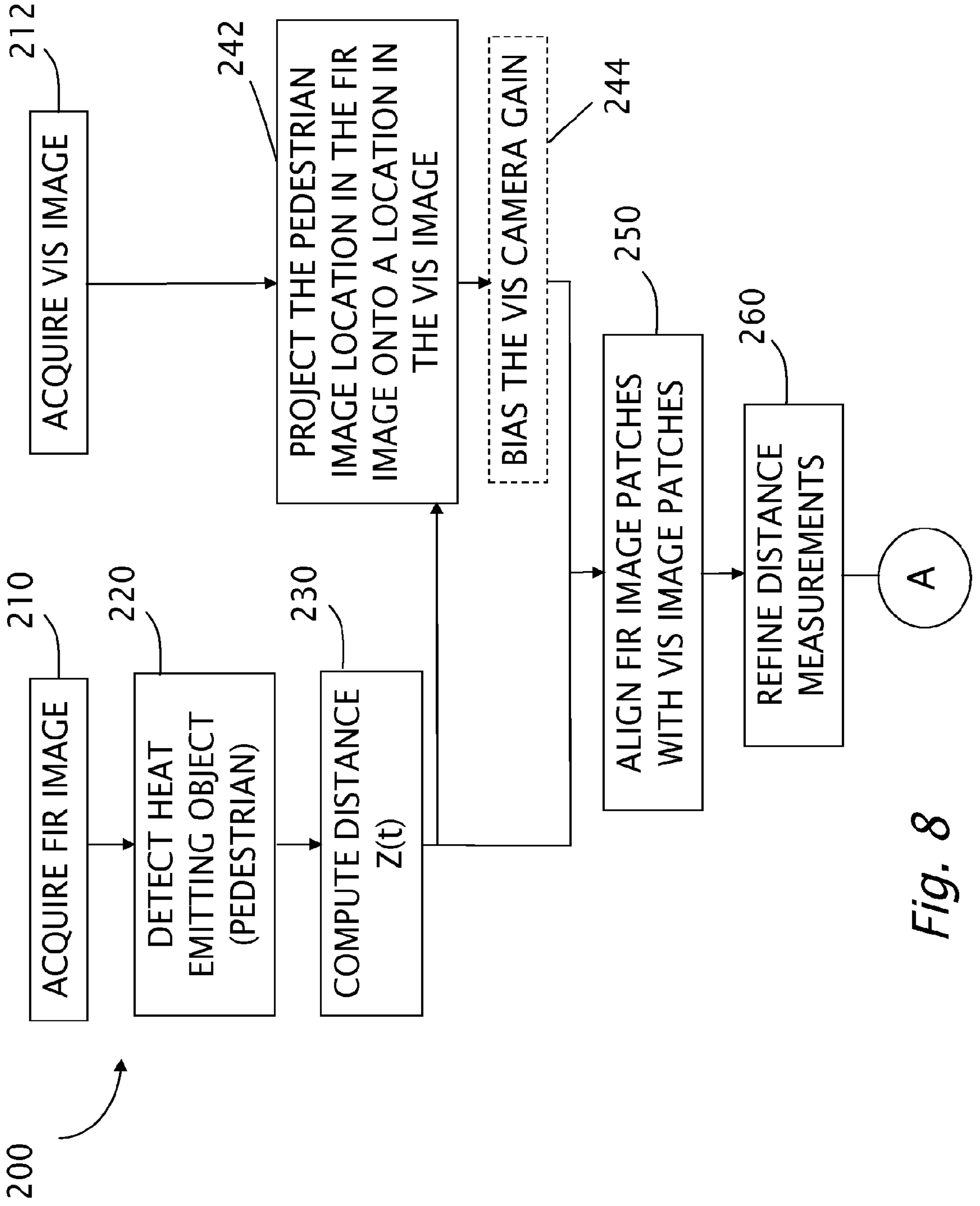
FIG. 8 is flow diagram which illustrates an algorithm for refining distance measurements, in accordance with embodiments of the present invention.

One embodiment of the invention is particularly applicable to nighttime and is illustrated in the flow chart of FIG. 8 outlining a recursive algorithm 200. A pedestrian 10 is detected in step 220 in a FIR image acquired in step 210. A distance D to selected points of detected pedestrian 10 is computed in step 230 and then, a matching pedestrian 10 (or part of a pedestrian, typically legs or feet, since these are illuminated even by the low beams) is found in the VIS image after projecting in step 242 the rectangle representing pedestrian 10 in the FIR image onto a location in the VIS image. Matching is performed by searching along the epipolar lines for a distance D that optimizes one of the alignment measures in step 250. Since a rough estimate of the distance D can be obtained, one can restrict the search to D that fall within that range. A reverse sequence of events is also possible. Legs are detected in the visible light image and are then matched to legs in the FIR image, acquired in step 212. After alignment is established in step 250, the distance measurements are refined in step 260, having two sources of distance information (from the FIR image and the VIS image) as well as stereo correspondence information.

Figure 9:
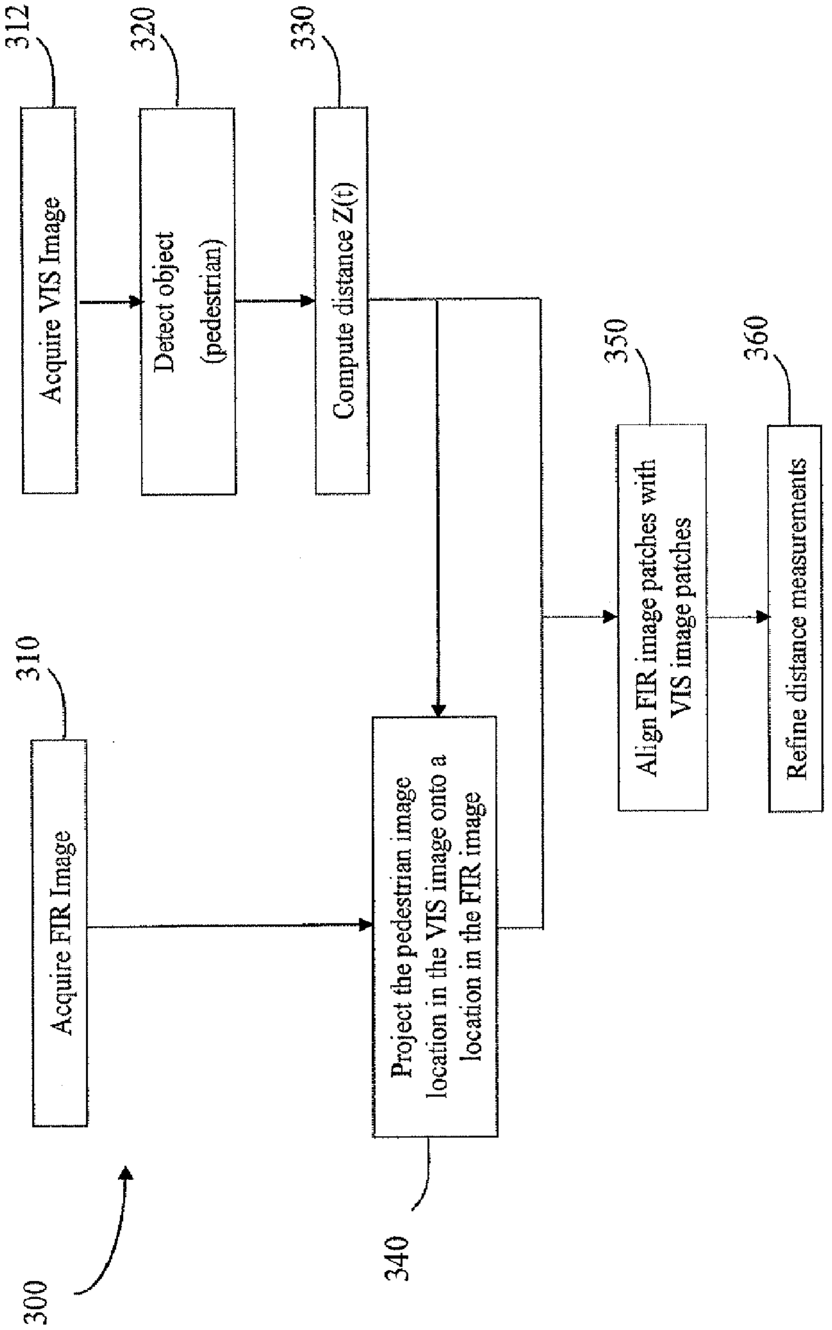
FIG. 9 is flow diagram which illustrates an algorithm for refining distance measurements, in accordance with embodiments of the present invention.

FIG. 9 is flow diagram which illustrates a recursive algorithm 300 for refining distance measurements, in accordance with embodiments of the present invention. In a second embodiment of the present invention, in step 320, an obstacle such as a vehicle is detected in the VIS image, acquired in step 312. A distance D to selected points of detected pedestrian 10 is computed in step 330 and then, a corresponding vehicle is then detected in the FIR image, acquired in step 310. In step 340, the rectangle representing pedestrian 10 in the VIS image is projected onto a location in the VIS image. In the next step 350, features between the detected targets in the two images are aligned and matched. During the daytime, the FIR image of the vehicle is searched for the bright spots corresponding to the target vehicle wheels and the exhaust pipe. In the visible light image, the tires appear as dark rectangles extending down at the two sides of the vehicle. The bumper is typically the lowest horizontal line in the vehicle. At night, bright spots in both images correspond to the taillights. The features are matched by searching along the epipolar lines. Matched features are used in step 360 for stereo correspondence.

The accurate range estimates can be used for applications such as driver warning system, active braking and/or speed control. The driver warning system can perform application selected from the group of applications consisting of: detecting lane markings in a road, detecting pedestrians, detecting vehicles, detecting obstacles, detecting road signs, lane keeping, lane change assist, headway keeping and headlights control.

2. Extending the FIR Camera Field of View

In order to provide good visibility of pedestrians 10 at a far distance (typically over 50 meters), FIR camera 120 has a narrow FOV. One drawback of a narrow FOV is that when a vehicle 50 approaches a pedestrian 10 which is in the vehicle 50 path but not imaged at the center of the FIR image, the pedestrian 10 leaves the FIR camera FOV. Thus, in the range of 0-10 meters, where human response time is too long and automatic intervention is required, the target 10 is often not visible by FIR camera 120 and therefore automatic intervention such as braking cannot be applied.

The FOV of VIS camera 110 is often much wider. Furthermore, the VIS camera 110 is mounted inside the cabin, typically 1.5 meter to 2 meters to the rear of FIR camera 120. Thus, the full vehicle width is often visible from a distance of zero in front of the vehicle 50.

Figure 10:
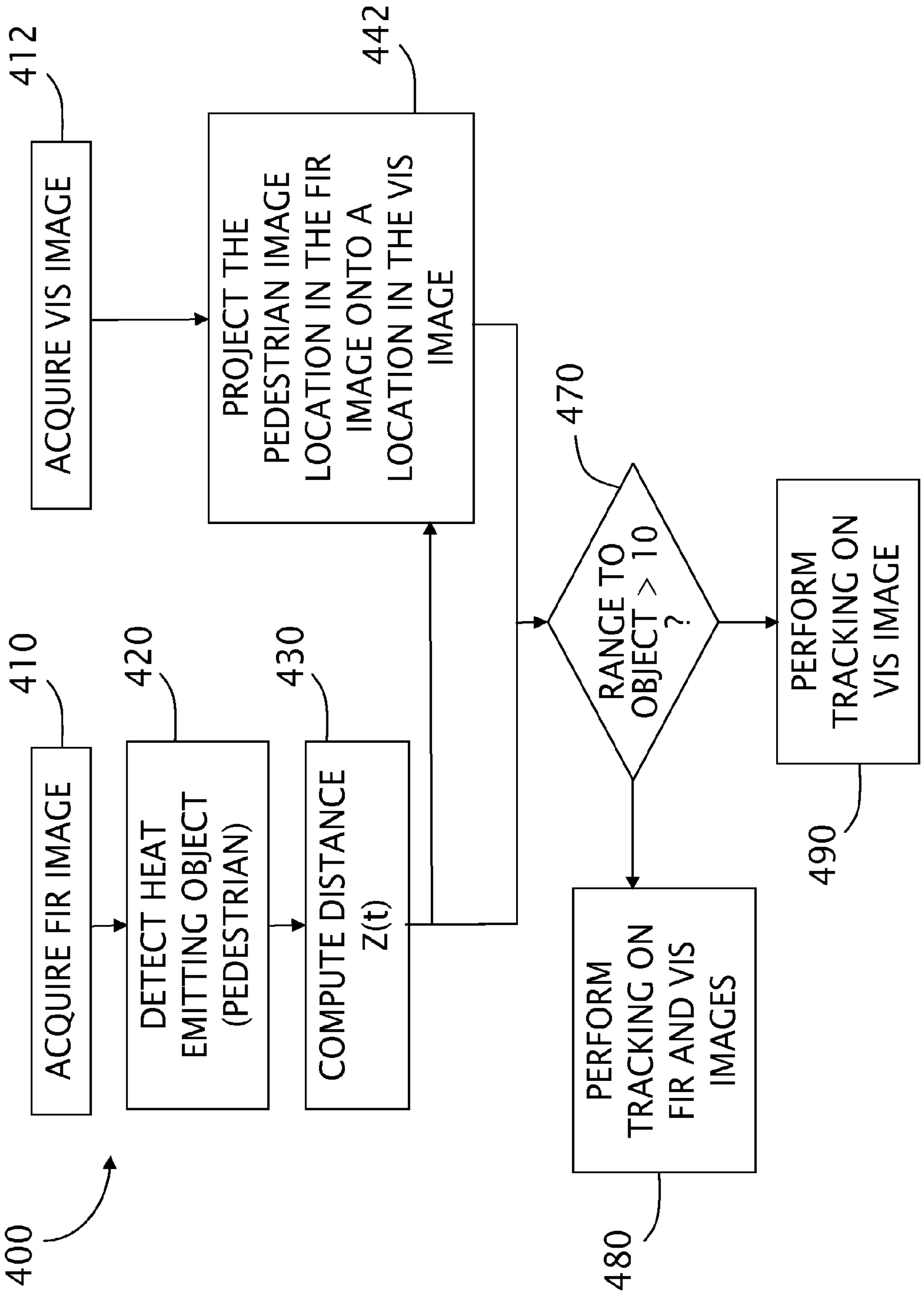
FIG. 10 is flow diagram which illustrates an algorithm for tracking based on both FIR and VIS images, in accordance with embodiments of the present invention.

FIG. 10 is flow diagram which illustrates a recursive algorithm 400 for tracking based on both FIR and VIS images acquired in respective step 410 and 412, in accordance with embodiments of the present invention. In a third embodiment of the present invention, a pedestrian 10 is detected in step 420, in the FIR image, an accurate range D can be determined in step 430, and matched to a patch in the VIS image (as described above) in step 442. In step 280, the pedestrian 10 is tracked in each camera separately using standard SSD tracking techniques and the match is maintained. As the pedestrian 10 leaves FIR camera 120 FOV as determined in step 270, the tracking is maintained by VIS camera 110 in step 290. Since the absolute distance was determined while still in FIR camera 120 FOV, relative changes in the distance, which can be obtained from tracking, is sufficient to maintain accurate range estimates. The pedestrian 10 can then be tracked all the way till impact and appropriate active safety measures can be applied.

3. Improving Detection Reliability by Mixing Modalities

Figure 11B:
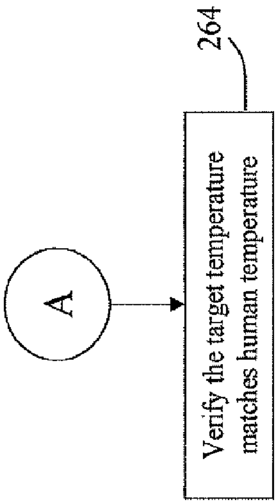
FIG. 11*b* is flow diagram which illustrates algorithm steps for verifying human body temperature, in accordance with embodiments of the present invention.
Figure 11A:
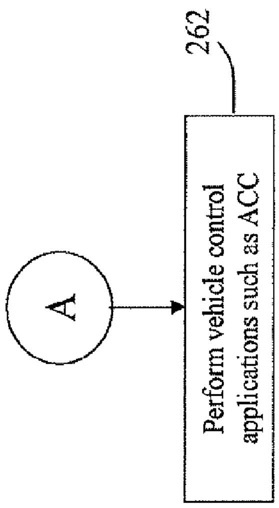
FIG. 11*a* is flow diagram which illustrates algorithm steps for vehicle control, in accordance with embodiments of the present invention.

Visible light cameras 110 give good vehicle detection capability in both day and night. This has been shown to provide a good enough quality signal for Adaptive Cruise Control (ACC), for example. However, mistakes do happen. A particular configuration of unrelated features in the scene can appear as a vehicle. The solution is often to track the candidate vehicle over time and verify that the candidate vehicle appearance and motion is consistent with a typical vehicle. Tracking a candidate vehicle over time, delays the response time of the system. The possibility of a mistake, however rare, also reduces the possibility of using a vision based system for safety critical tasks such as collision avoidance by active braking. FIG. 11*a* is flow diagram which illustrates algorithm steps for vehicle control, and FIG. 11*b* is flow diagram which illustrates algorithm steps for verifying human body temperature, in accordance with embodiments of the present invention. The brightness in an FIR image corresponds to temperature of the imaged object. Hence, the brightness in an FIR image can be analyzed to see if the temperature of the imaged object is between 30° C. and 45° C.

In a fourth embodiment of the present invention, a vehicle target, whose distance has been roughly determined from VIS camera 110, is matched to a patch in the FIR image. The patch is then aligned. The aligned patch in the FIR image is then searched for the telltale features of a vehicle such as the hot tires and exhaust. If features are found the vehicle target is approved and appropriate action can be performed sooner, in step 262.

In a fifth embodiment of the invention, a pedestrian target 10 is detected by VIS camera 110 in a well illuminated scene. A range D estimate is obtained using triangulation with the ground plane 20 and other techniques (described above). Using the epipolar geometry (defined above), the target range and angle (i.e. image coordinates) provide a likely target location in the FIR image. Further alignment between the two images is performed if required. The image brightness in the FIR image is then used to verify that the temperature of the target matches that of a human, in step 264. This provides for higher reliability detection of more difficult targets.

In certain lighting conditions VIS camera 110 cannot achieve good contrast in all parts of the image. VIS camera 110 must then make compromises and tries and optimize the gain and exposure for certain regions of the interest. For example, in bright sunlit days, it might be hard to detect pedestrians in the shadow, especially if the pedestrians are dressed in dark clothes.

Hence, in a sixth embodiment of the invention, a pedestrian target 10 candidate is detected in the FIR image. Information about target angle and rough range is transferred to the visible light system. In step 244 of algorithm 200 shown in FIG. 8, the camera system optimizes the gain and exposure for the particular part of the image corresponding to the FIR target. The improved contrast means the shape of the target can be verified more reliably.

In another embodiment of the present invention, a Near Infra Red (NIR) camera is used instead of a visible light camera. Since the NIR camera is often located inside the cabin, typically near the rearview mirror, the fusion discussed between visible light cameras and FIR also work between NIR and FIR. The range of the fusion region will of course be larger due to extended night time performance of the NIR camera.

Therefore, the foregoing is considered as illustrative only of the principles of the invention. Further, since numerous modifications and changes will readily occur to those skilled in the art, it is not desired to limit the invention to the exact design and operation shown and described, and accordingly, all suitable modifications and equivalents may be resorted to, falling within the scope of the invention.

While the invention has been described with respect to a limited number of embodiments, it will be appreciated that many variations, modifications and other applications of the invention may be made.

We claim:

1. A method performable by a computerized system mountable on a vehicle, wherein the system includes a first camera and a second camera connectible to a processor, the method comprising:

first capturing a plurality of first image frames from the first camera;

second capturing a plurality of second image frames from the second camera;

detecting said object by processing said first image frames thereby producing a detected object;

first determining a first range to said detected object using said first image frames;

projecting an image location of said detected object in at least one of said first image frames onto an image location in at least one of said second image frames;

second determining a second range from the vehicle to said detected object based on both said first image frames and said second image frames; and tracking said detected object in both said first image frames and second image frames and when said detected object leaves a field of view of the first camera, third determining a third range to said detected object responsive to said second range and said second image frames.

2. The method of claim 1, wherein said projecting is performed by aligning a patch of said at least one second image with a patch of said at least one first image, thereby producing an aligned object, wherein said aligning is bounded by said first range.

3. The method of claim 2, wherein said aligning is performed using at least one mechanism selected from the group consisting of histograms of gray scale values, sub-patch correlation and Hausdorf distance computational techniques.

4. The method of claim 1, wherein said second determining second second range is performed by stereo analysis.

5. The method of claim 1, wherein said tracking of said detected object by either of said first camera and said second camera is terminated, the camera that has not terminated said tracking proceeds with said tracking.

6. The method of claim 1, further comprising adjusting a gain or exposure of the second camera responsive to detecting the object in first camera image frame.

7. The method of claim 1, wherein said locating the detected object in the second camera image frame includes searching for the image of the detected object in the second camera image frame around an epipolar line corresponding to the detected object in the first camera image frame.

8. A computerized system mountable on a vehicle, wherein the system includes a first camera and a second camera connectible to a processor, the processor operable to:

first capture a plurality of first image frames from the first camera;

second capture a plurality of second image frames from the second camera;

detect said object by processing said first image frames to produce thereby a detected object;

determine a first range to said detected object using said first image frames;

project an image location of said detected object in at least one of said first image frames onto an image location in at least one of said second image frames;

determine a second range from the vehicle to said detected object based on both said first image frames and said second image frames;

track said detected object in both said first image frames and second image frames and when said detected object leaves a field of view of the first camera, determine a third range to said detected object responsive to said second range and said second image frames.

9. The system of claim 8, wherein the first camera has a field of view (FOV) of less than thirty five degrees.

10. The system of claim 8, wherein the second camera has a field of view (FOV) of more than twenty five degrees.

11. The system of claim 8, wherein the first and second cameras are directed forwards to acquire images in the direction of travel of the vehicle.

12. The system of claim 8, wherein the first and second cameras are directed backwards to acquire images in the direction opposite the direction of travel of the vehicle.

13. The system of claim 8, wherein the first and second cameras are mounted on the vehicle at substantially different heights above road surface.

14. The system of claim 8, wherein the first and second cameras are mounted on the vehicle at substantially different lateral locations in a dimension perpendicular to the forward direction of movement of the vehicle.

15. The system of claim 8, wherein the first camera includes a visible light blocking and near infrared (NIR) passing filter, and thereby images only NIR spectrum light.

* * * * *